US012647196B2

(12) United States Patent
Tench

(10) Patent No.: US 12,647,196 B2
(45) Date of Patent: Jun. 2, 2026

(54) WIDEBAND HOLLOW CORE TRANSMISSION FIBER AND DWDM LIGHTWAVE TRANSMISSION SYSTEM IN THE 2000 nm WAVELENGTH REGION

(71) Applicant: RET and Associates LLC, Allentown, PA (US)

(72) Inventor: Robert Ehrler Tench, Allentown, PA (US)

(73) Assignee: RET AND ASSOCIATES LLC, Allentown, PA (US)

( * ) Notice: Subject to any disclaimer, the term of this patent is extended or adjusted under 35 U.S.C. 154(b) by 0 days.

(21) Appl. No.: 18/804,710

(22) Filed: Aug. 14, 2024

(65) Prior Publication Data

US 2026/0051966 A1 Feb. 19, 2026

(51) Int. Cl.
| | |
|---|---|
| *H04J 14/02* | (2006.01) |
| *G02B 6/032* | (2006.01) |
| *H04B 10/29* | (2013.01) |

(52) U.S. Cl.
CPC .............. *H04J 14/03* (2023.08); *H04B 10/29* (2013.01); *H04J 14/0215* (2013.01); *G02B 6/032* (2013.01)

(58) Field of Classification Search
None
See application file for complete search history.

(56) References Cited

U.S. PATENT DOCUMENTS

| | | | | |
|---|---|---|---|---|
| 5,355,250 A | * | 10/1994 | Grasso ............... | H04B 10/2931 |
| | | | | 359/341.44 |
| 6,690,884 B1 | * | 2/2004 | Kelty ................... | H04B 10/695 |
| | | | | 714/704 |
| 11,215,751 B2 | | 1/2022 | Poletti et al. | |
| 12,218,705 B1 | * | 2/2025 | LaChapelle ........ | H04B 10/2537 |

(Continued)

FOREIGN PATENT DOCUMENTS

WO    WO 2024/015192    1/2024

OTHER PUBLICATIONS

Y. Chen et al., "Hollow Core DNANF Optical Fiber with <0.11 dB/km Loss," 2024 Optical Fiber Communications Conference and Exhibition (OFC), San Diego, CA, USA, 2024, pp. 1-3. (Year: 2024).*

(Continued)

*Primary Examiner* — Darren E Wolf
(74) *Attorney, Agent, or Firm* — Mark T. Vogelbacker; Eckert Seamans Cherin & Mellott, LLC

(57) ABSTRACT

A long-distance DWDM lightwave transmission system operating in the 2000 nm wavelength region is proposed that is based on the utilization of hollow core fiber configured to exhibit low loss (e.g., on the order of 0.02 dB/km) in combination with a hybrid TDFA/HDFA repeater device. Multiple concatenated spans of the combination of the hollow core fiber and hybrid TDFA/HDFA repeater device are able to provide communication over path lengths in excess of 10,000 km without the need for electronic regeneration of the propagating signals. In one case, the hollow (Continued)

core fiber is configured as a double-nested anti-resonant nodeless fiber (DNANF) with the number of nested structures and their various parameters optimized to provide the low loss operation in the 2000 nm region.

7 Claims, 11 Drawing Sheets

(56) References Cited

U.S. PATENT DOCUMENTS

| | | | |
|---|---|---|---|
| 2002/0154855 A1* | 10/2002 | Rose | H04J 14/02 |
| | | | 385/24 |
| 2004/0109655 A1* | 6/2004 | Dennis | H04B 10/2916 |
| | | | 385/123 |
| 2019/0227226 A1* | 7/2019 | Abaie | G02B 6/02304 |
| 2021/0194203 A1* | 6/2021 | Savage-Leuchs | |
| | | | H01S 3/06754 |
| 2022/0021173 A1* | 1/2022 | Tench | H01S 3/06754 |

OTHER PUBLICATIONS

Chen, et al., "Hollow Core DNANF Optical Fiber with <0.11 dB/km Loss", OFC 2024, Optica Publishing Group 2024.
Poggiolini, "Opportunities and Challenges for Long-Distance Transmission in Hollow-Core Fibres", Journal of Lightwave Technology, vol. 40, No. 6, Mar. 15, 2022, pp. 1605-1616.
Jasion, G. T., et al., 0.174 dB/km Hollow Core Double Nested Antiresonant Nodeless Fiber (DNANF), Authorized licensed use limited to: Robert Tench. Downloaded on Mar. 5, 2026 at 11:25:33 UTC from IEEE Xplore.
Poletti, F., Nested antiresonant nodeless hollow core fiber, Optics Express, Oct. 6, 2014, vol. 22, No. 20, pp. 23807-23828.

* cited by examiner

WIDEBAND HOLLOW CORE TRANSMISSION FIBER AND DWDM LIGHTWAVE TRANSMISSION SYSTEM IN THE 2000 nm WAVELENGTH REGION

TECHNICAL FIELD

Disclosed herein is an optical transmission system operating in the 2000 nm region and configured to provide dense wavelength division multiplexed (DWDM) communication over long distances (e.g., in excess of 20,000 km) without requiring electronic regeneration.

BACKGROUND OF THE INVENTION

Hollow-core optical transmission fibers and DWDM lightwave systems capable of operating in the 2000 nm wavelength region have an important role to play in many forward-looking optical system and network applications. Recent developments in rare earth elements such as Holmium (Ho) and Thulium (Tm) present known materials for generating amplification in the 2000 nm wavelength region, and a recent optical fiber amplifier design employing a hybrid TDFA/HDFA architecture with a 380 nm continuous operating bandwidth in the 2000 nm spectral region has now been developed. A full disclosure this type of hybrid amplifier is disclosed in our co-pending U.S. application Ser. No. 18/761,674, filed Jul. 2, 2024 and herein incorporated by reference.

While various types of hollow core fibers and DWDM transmission systems have been developed for the conventional optical communication wavelengths of 1060 nm, 1300 nm, and 1550 nm, there has not been an appreciable effort toward creating wideband hollow core fibers and DWDM lightwave transmission systems that are fully operable in, and optimized for, the 2000 nm spectral region. Such wideband hollow core fibers and DWDM transmission systems are considered to be strategic building blocks for creating and implementing optical lightwave systems and networks capable of operation over transmission distances in excess of 40,000 km without requiring electronic regeneration, while maintaining robust OSNR and Q-factor margins at the beginning and the end of the system life cycle.

SUMMARY OF THE INVENTION

The needs remaining in the art are addressed by the present invention, which relates to an optical transmission system operating in the 2000 nm region and configured to provide DWDM communication over long distances (e.g., in excess of 20,000 km) without requiring electronic regeneration.

More particularly, the present invention is directed to a high-capacity 2000 nm DWDM lightwave transmission system based on a hollow core fiber configured to exhibit low loss (e.g., on the order of 0.02 dB/km), used in combination with the hybrid fiber amplifier disclosed in our co-pending application to achieve all-optical transmission through fiber spans exceeding 40,000 km, where "all-optical" is defined as not requiring any type of electronic regeneration of the propagating signal.

In exemplary embodiments, the hollow core fiber used to support wideband transmission may take the form of a double-nested anti-resonant nodeless fiber (DNANF), with the number of nested structures and their various parameters optimized to provide the required low loss within a defined wideband operation range (e.g., 1725-2105 nm) in the 2000 nm region. The wideband hollow core optical transmission fiber itself may be configured in one embodiment to include five hollow core transmission elements, with each element formed of three individually nested circular structures, all contained in an outer cladding as described in detail below.

A long-distance DWDM transmission system of the present system comprises a plurality of spans of DNANF, with hybrid TDFA/HDFA amplifiers positioned at strategic locations between the termination points of the long-distance DWDM transmission path, providing all-optical transmission of a large number of individual channels.

An exemplary embodiment of the present invention may take the form of a long-distance, all-optical DWDM lightwave transmission system operating in the 2000 nm region. Particularly, the system includes a pair of optical transceiver stations separated by a distance of at least several thousand of kilometers (km), where the pair of optical transceiver stations may be defined as a west transceiver station and an east transceiver station. Also included is a first optical fiber signal path for supporting DWDM lightwave transmission from the west transceiver station to the east transceiver station, and a second optical fiber signal path for supporting DWDM lightwave transmission from the east transceiver station to the west transceiver station. The first and second optical fiber signal paths each comprise a plurality of N transmission spans, each transmission span comprising a hybrid TDFA/HDFA repeater device and a section of hollow core fiber coupled to the output of the repeater device, wherein the output from the $N^{th}$ section of hollow core fiber in the first optical fiber signal path is coupled to an input of the east transceiver station and the output from the $N^{th}$ section of hollow core fiber in the second optical fiber signal path is coupled to an input of the west transceiver station. Additionally, the system includes a first optical fiber coupled between an output of the west transceiver station and a first hybrid TDFA/HDFA repeater device of a first transmission span of the first plurality of N transmission spans and a second optical fiber coupled between an output of the east transceiver station and a first hybrid TDFA/HDFA repeater device of a first transmission span of the second plurality of N transmission spans, wherein DWDM lightwave transmission between the west transceiver station and the east transceiver station is supported along the signal paths without requiring electrical regeneration of the propagating optical signals.

Other and further embodiments and aspects of the present inventions will become apparent during the course of the following discussion and by reference to the associated drawings.

BRIEF DESCRIPTION OF THE DRAWINGS

Referring now to the drawings, where like numerals represent like parts in several views:

FIG. 7 shows yet another alternative embodiment of the 2000 nm DWDM lightwave system, in this case including an optical branching element along the signal path, used as an add/drop element;

FIG. 14 shows an exemplary 40,000 km unregenerated 2000 nm DWDM Pb/s optical fiber submarine transmission system named North-South TransGlobal I, where POP=point of presence for electrical powering and optical/electronic add/drop, and OBU=optical branching unit.

DETAILED DESCRIPTION

Figure 1:
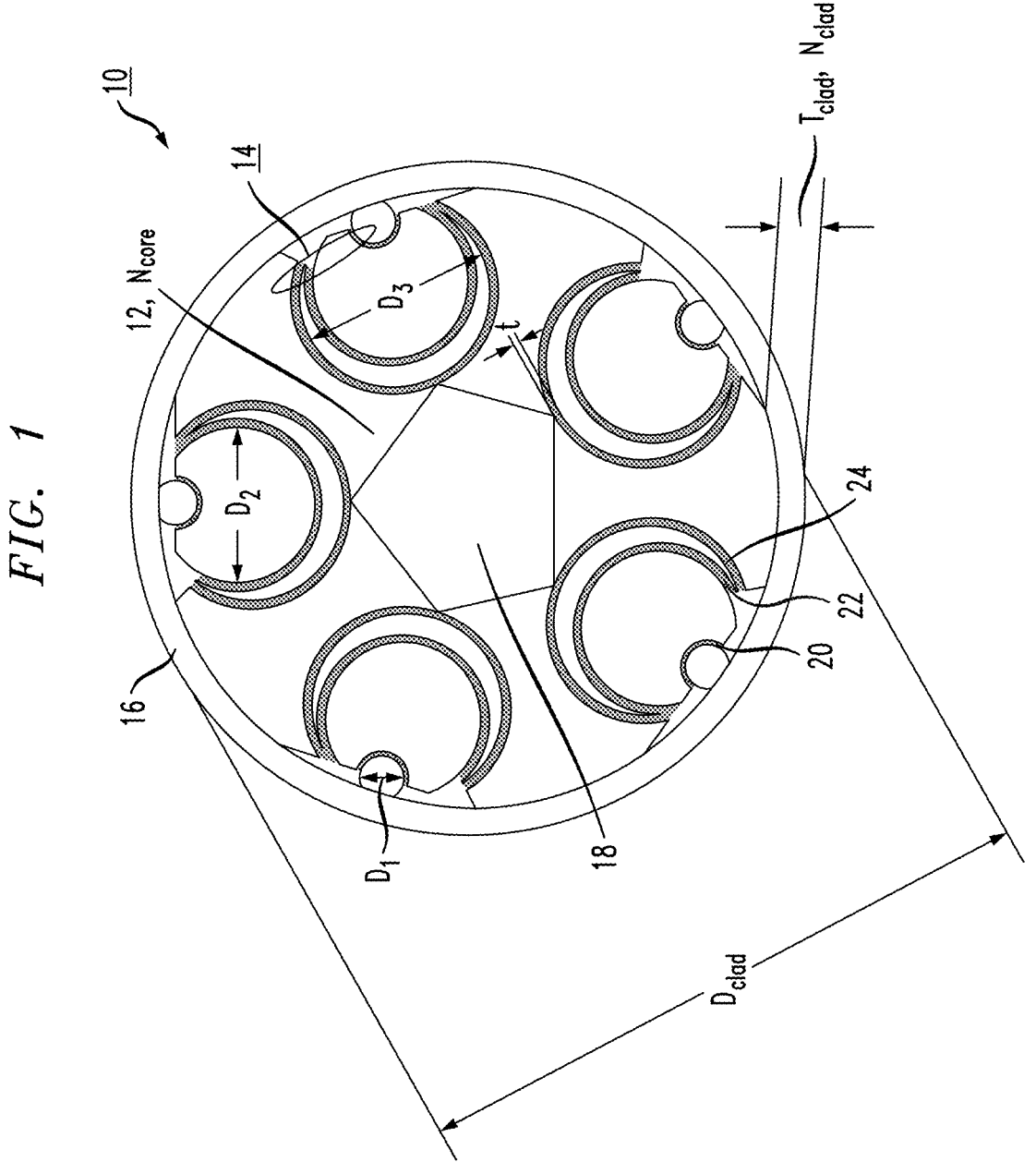
FIG. 1 illustrates an exemplary wideband DNANF hollow core fiber design with a five element structure of guiding nested fused silica tubes of diameters $D_1$, $D_2$, and $D_3$, thicknesses T and t, and refractive indices $N_{core}$ and $N_{clad}$, all arranged within an outer cladding of diameter $D_{clad}$ and refractive index $N_{clad}$.

FIG. 1 is a cut-away view of an exemplary double-nested anti-resonant nodeless fiber 10 (DNANF 10) formed in accordance with the principles of the present invention to provide requisite wideband transmission (e.g., 380 nm bandwidth in the 2000 nm region) and loss (e.g., ≤0.030 dB/km) characteristics required to support long-distance transmission in the disclosed DWDM transmission system.

In particular, the geometry, architecture, and design of DNANF 10 are critical features that need to be controlled in order to form such a fiber exhibiting the novel low loss performance required in the 2000 nm operating band of the spectrum. With particular reference to FIG. 1, DNANF 10 is shown as comprising a hollow core region 12 formed of including a plurality of "double-nested" tube arrangements 14. An outer cladding layer 16 is shown as surrounding hollow core region 12.

Continuing with a description of hollow core region 12, each tube arrangement 14 comprises a double-nested arrangement of three individual tubes, referenced as an inner tube 20, a middle tube 22, and an outer tube 24. As will be discussed in detail below, the number of individual tube arrangements 14, as well as the dimensions of the individual tubes 20, 22, and 24 forming each nested arrangement, are controlled to provide the transmission characteristics discussed.

With further reference to FIG. 1, the designation $D_{clad}$ is used to define the diameter of outer cladding layer 16, with $T_{clad}$ used to define the thickness of outer cladding layer 16. $N_{clad}$ is used to reference the refractive index of outer cladding layer 16, with $N_{core}$ used to reference the refractive index of the nested hollow guiding arrangement forming hollow core region 12.

Diameters $D_1$, $D_2$, and $D_3$ are shown as defining the diameters of nested tubes 20, 22, and 24, respectively. Each individual tube is identified as having a similar thickness t. In the particular embodiment as shown in FIG. 1, a set of five tube arrangements 14, arranged in the interior of DNANF 10 in a pentagonal structure to define a central hollow core region 18 that supports the propagation of an optical signal in an anti-resonant, nodeless manner.

In one example embodiment, the values of these key parameters and dimensions for providing optimized operation in the 2000 nm region of the spectrum have been found to fall within the following ranges: $D_{clad}=125$ μm±10 μm; $T_{clad}=10$ μm±8 μm; $D_1=10$ μm±8 μm; $D_2=28$ μm±10 μm; $D_3=32$ μm±10μ; t=3 μm±2.8 μm; $N_{clad}=1.50±0.20$; and $N_{core}=1.50±0.20$. The precise values of these parameters for optimized operation in the 2000 nm region of the spectrum will be apparent to those skilled in the art.

Figure 2:
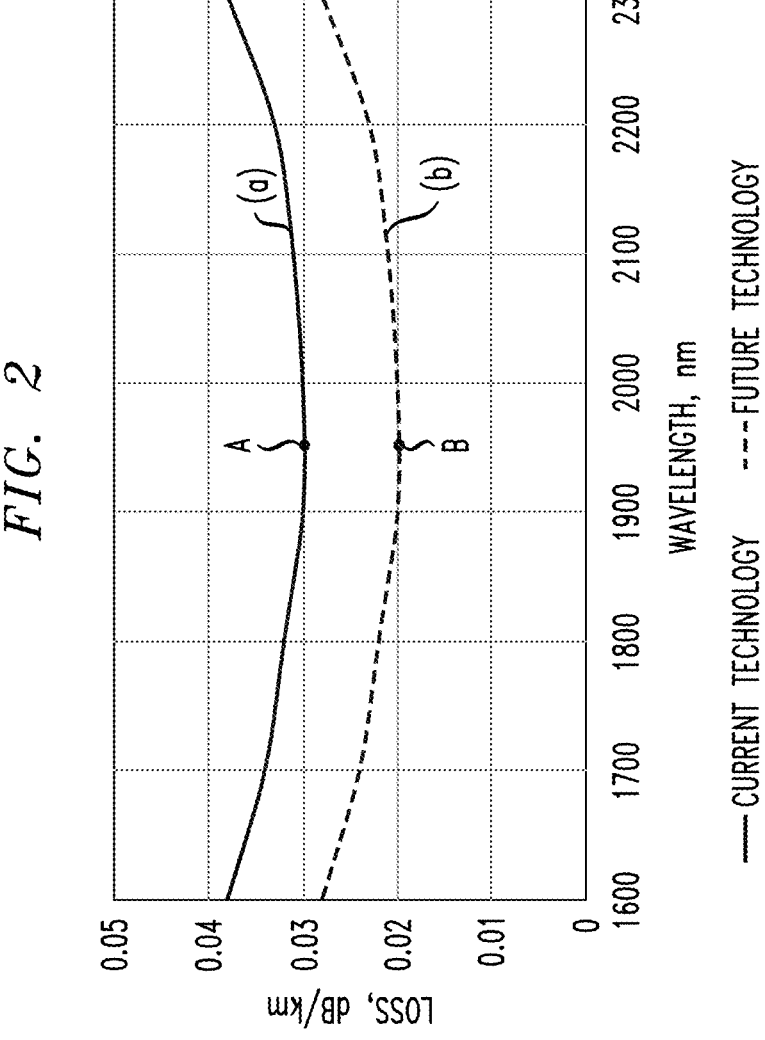
FIG. 2 contains a pair of plots of the simulated loss of the DNANF design in FIG. 1 optimized specifically for transmission in the 2000 nm region of the spectrum, plot (a) generated using current manufacturing technology and exhibiting a minimum loss of 0.030 dB/km at 2000 nm, and plot (b) generated using presumed advances in manufacturing technology and exhibiting a minimum loss of 0.020 dB/km at 2000 nm.

FIG. 2 contains plots of loss vs. wavelength for two different configurations of DNANF 10 that are specifically optimized for use in the 2000 nm region of the spectrum. The data contained in plot (a) is associated with the assumption of current manufacturing techniques and capabilities for fiber fabrication, and based on the following key parameters and dimensions of the fiber: $D_{clad}=125$ μm±10 μm; $T_{clad}=10$ μm±8 μm; $D_1=10±8$ μm; $D_2=28±10$ μm; $D_3=32±10$ μm; t=3±2.8 μm; $N_{clad}=1.50±0.20$; and $N_{core}=1.50±0.20$. The minimum loss in the 2000 nm region of the spectrum is found to be 0.03 dB/km at an operating wavelength of 1950 nm, designated as point A on curve (a) of FIG. 2. The precise values of the key parameters and dimensions for optimized operation in the 2000 nm region of the spectrum will be apparent to those skilled in the art.

Curve (b) in FIG. 2 is a plot of exemplary loss vs. wavelength values for a configuration of DNANF 10 that is formed using a more stringent manufacturing process that yields less variation in the diameter and thickness of outer cladding layer 16, as well as less variation in the diameters and thicknesses of the individual tubes 20, 22, and 24 of hollow core region 12. In this case, the minimum loss in the 2000 nm region of the spectrum is found to be 0.020 dB/km at 1950 nm (shown as point B on curve (b)), a reduction of 0.010 dB/km over the results shown in curve (a). Indeed, this 0.010 dB/km improvement in loss is evident across the complete wideband range from about 1730 to 2100 nm when comparing the results of curve (a) to those of curve (b). The precise values of the key parameters and dimensions for optimized operation in the 2000 nm region of the spectrum will be apparent to those skilled in the art.

With this understanding of the key parameters of an exemplary DNANF 10 as may be used to support optical communication with minimal loss in the 2000 nm region, its utilization in a novel DWDM communication system is described below.

Figure 3:
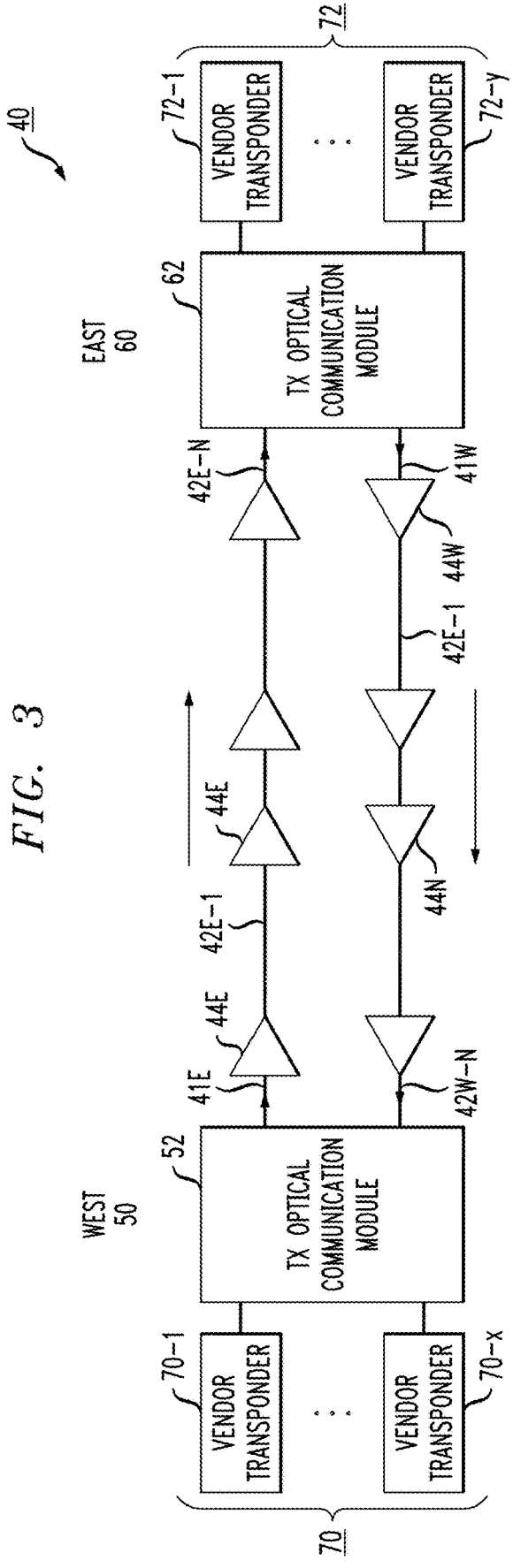
FIG. 3 is a schematic diagram of the overall architecture of the novel 2000 nm DWDM lightwave transmission system invention.

In particular, FIG. 3 is a simplified block diagram of a novel long-distance DWDM lightwave transmission system 40 formed in accordance with the principles of the present invention to provide wideband communication in the 2000 nm wavelength region without the need for electronic regeneration of the propagating optical data signals. For the purposes of the present invention, "long-distance" is intended to define a transmission system capable of operating over distances of tens of thousands of kilometers. For example, one embodiment of DWDM transmission system 40 may be configured to provide transmission over a distance of about 10,000 km (or more) to provide a DWDM terrestrial system (without the need for electronic regeneration). In another embodiment, system 40 may be configured to provide transmission (without electronic regeneration) over a distance of about 40,000 km when utilized to provide a submarine (i.e., undersea) communication systems.

With particular reference to FIG. 3, long-distance DWDM transmission system 40 is shown as utilized to provide bi-directional optical communication between a first location 50 (defined as the "west" location for ease of explanation) and a second (east) location 60, with these locations separated by a distance of tens of thousands of kilometers (for example). A first set of individual vendor transponders 70 is shown as coupled to a first optical communication module 52 disposed at west location 50, with a second set of individual vendor transponders 72 in communication with a second optical communication module 62 disposed at east location 60. First and second optical communication modules 52, 62 are configured in a manner well-known in the art to provide bi-directional optical communication and include both passive and active optical components. Within each transceiver, a multiplicity of transmitting channels with optically modulated data in the 2000 nm band are optically multiplexed onto a single section of DNANF output fiber 41 to thereafter propagate along concatenated combinations of a hybrid TDFA/HDFA amplifying device (functioning as a repeater) and a span of DNANF, as discussed below.

A first plurality of spans 42E of DNANF 10 is disposed as shown in FIG. 3 to form the eastward optical signal path between west location 50 and east location 60, with a second plurality of spans 42W of DNANF 10 forming the westward signal path between these locations (i.e., from east location 60 to west location 50). The number of individual spans N required to form an exemplary "long distance" optical transmission system in accordance with the principles of the present invention is necessarily a function of the total distance the optical signals must travel between locations 50 and 60.

Referring to first optical communications module 52, for example, a multiplicity of data signals from vendor sources 70 are used to modulate assigned carrier wavelengths within a defined operating band in the 2000 nm region, forming a plurality of transmission channels. The signals along the different channels are then optically multiplexed together and provided as an input to eastward output fiber 41E. Thereafter, the multiplexed signals propagate along concatenated spans of DNANF 42E (separated by TDFA/HDFA repeaters 44 as described below). At the receive end of the eastward propagation path (i.e., at optical communications module 62 of east termination 60), the multiple optical data channels exiting a final fiber span 42E-N are coupled into optical communications module 62 and thereafter demultiplexed and then separately received with a multiplicity of optical receivers for conversion into electronic data signals which are then processed for further communications purposes.

A strategic component useful in maintaining an all-optical transmission path over the long distance (e.g., 10,000-40,000 km) separating west location 50 and east location 60 is the wideband hybrid TDFA/HDFA device mentioned above as disclosed in our co-pending application and used in WDN transmission system 40 as an optical repeater. A first plurality of hybrid TDFA/HDFA repeaters 44E is shown as disposed along the eastward signal path formed by fiber spans 42E of DNANF 10. A second plurality of hybrid TDFA/HDFA repeaters 44W is shown as disposed along the westward path formed by fiber spans 42W of DNANF 10.

For the purposes of the present invention, an exemplary hybrid TDFA/HDFA device 44 is configured to exhibit an effective operating bandwidth that is the same as (or similar to) the communication bandwidth of transmission system 40. It is contemplated that a hybrid device 44 being used as a repeater in this architecture should exhibit a bandwidth of about 350 nm within the 2000 nm region. Repeater 44 preferably has a total (fiber-coupled) output power (TOP) of at least 2.0 W, with a noise figure (NF) no greater than 6.0 dB. The average OSNR (per wavelength) should be about 50 dB/0.1 nm for a monochromatic input at 0 dBm.

Figure 4:
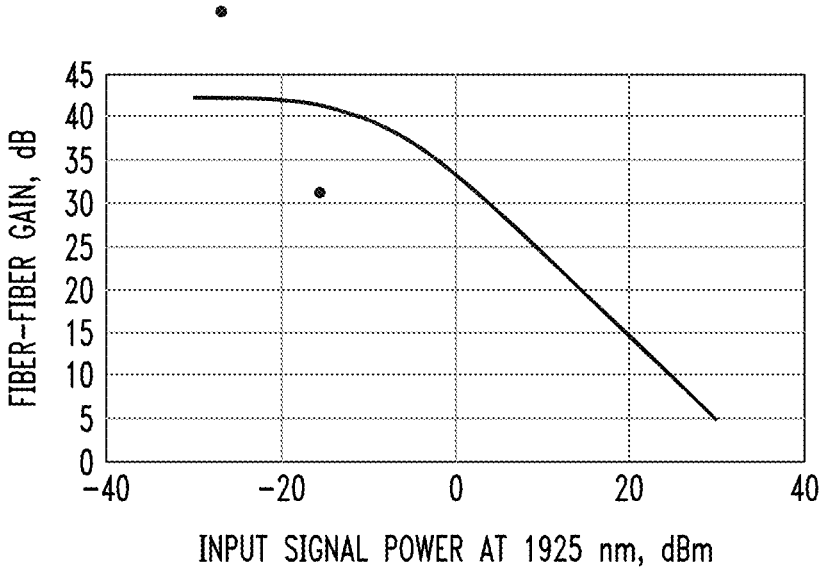
FIG. 4 shows the gain vs. signal input power curve for the hybrid TDFA-HDFA in the novel 2000 nm DWDM system.

An important parameter of hybrid TDFA/HDFA device 44 when used as a repeater in transmission system 40 is its gain vs input power performance. FIG. 4 presents a plot of simulated gain vs. input power for device 44, as discussed in detail in our co-pending application. Here, the small signal gain is shown to have a value of about 42 dB for an input power of −30 dBm. The fully saturated gain is shown to be about 5 dB at an input power of +30 dBm.

Figure 5:
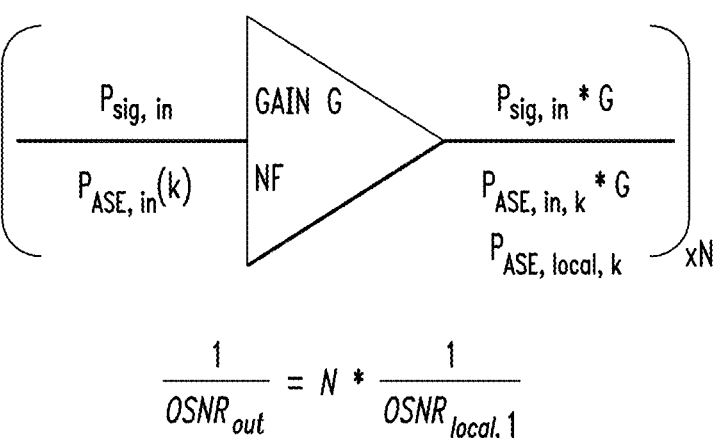
FIG. 5 presents the OSNR evolution in the 2000 nm DWDM lightwave system for a cascade of N identical amplified sections with amplifier gain=span loss.

Turning to a study of the characteristics of transmission system 40, one factor to understand is the cumulative effect of multiple spans and repeaters on the overall OSNR of the system. In particular, the OSNR evolution created along the plurality of N cascaded hybrid TDFA/HDFA devices 44 may be understood by reference to the relation shown in FIG. 5, which relates to the OSNR degradation in the presence of existing noise. For use as a repeater within transmission system 40, the amplifier gain is set to compensate for optical power loss along the span separating a pair of repeaters 44. Here, the gain of hybrid TDFA/HDFA device 44 is denoted as G, and as mentioned above the gain G is equal to the span losses of the previous and subsequent fiber spans.

The general formula for the OSNR (defined in dB, per 0.1 nm) as developed in the cascade of N devices can be defined by the following relation:

$$ONSR_{dB,0.1\,nm} = (60.2 + TOP) - (10\log_{10}NSPAN + G + NF + 10\log_{10} NCHAN),$$

where NSPAN is the total number of fiber spans cascaded together, G is the gain in dB, NF is the noise figure in dB, NCHAN is the total number of channels (wavelengths) supported by the transmission system, and TOP is the total output power of the fiber amplifier in dBm.

Figure 6:
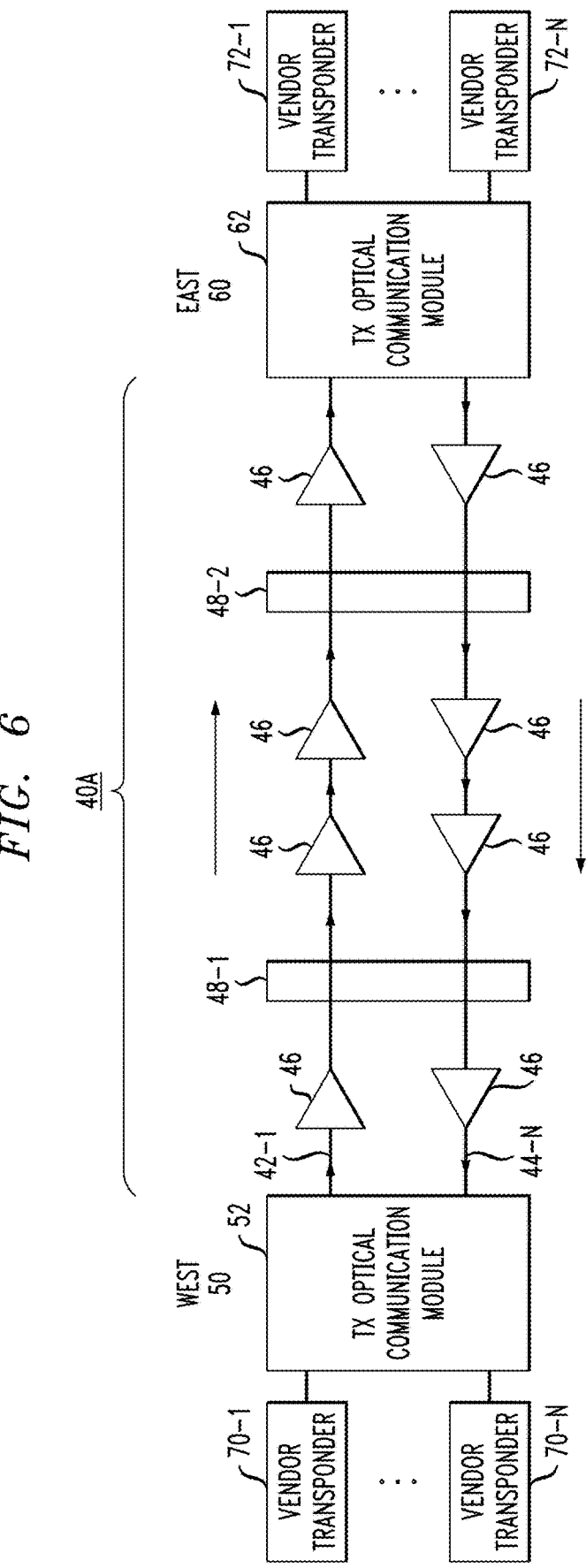
FIG. 6 is a schematic diagram of an alternative embodiment of the 2000 nm DWDM lightwave system of the present invention, in this case including gain-flattening filters disposed at strategic points along the signal path between end-point terminations.
Figure 7:
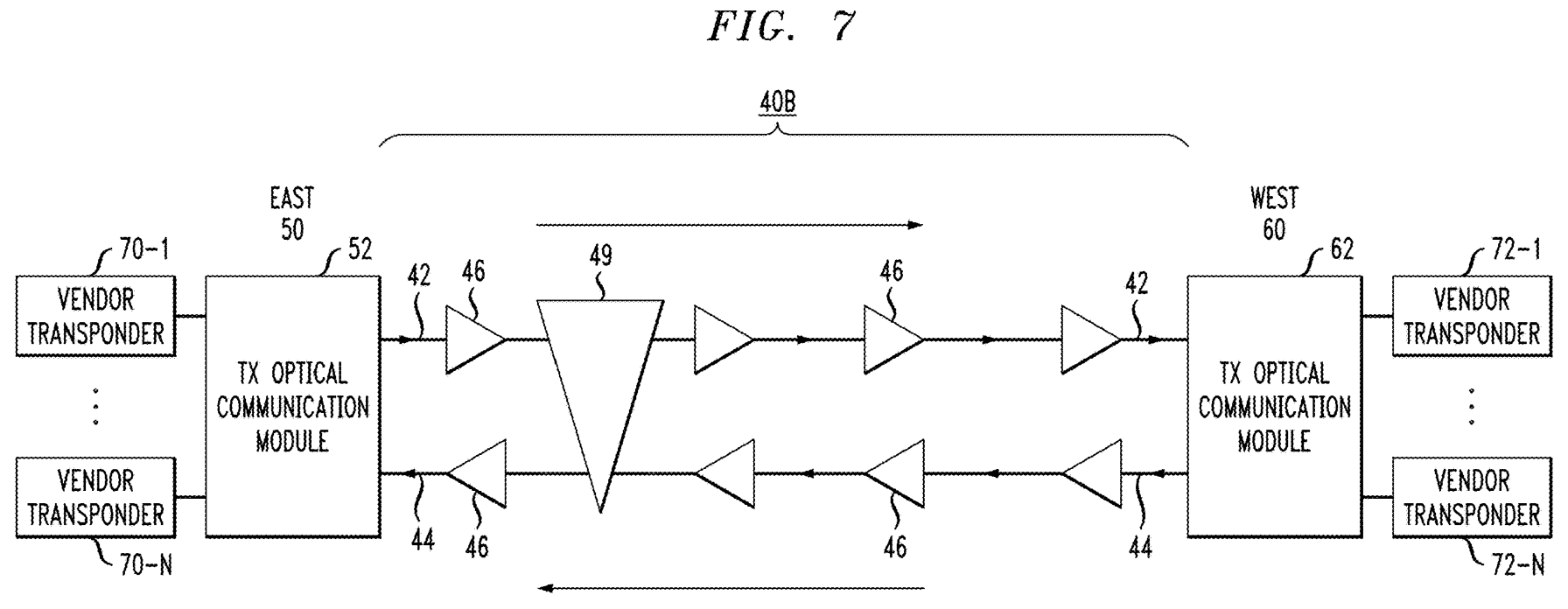

FIG. 6 illustrates an alternative embodiment of long-distance DWDM transmission system 40 of FIG. 3 (here denoted as system 40A). In this embodiment, one or more gain flattening filters 46 may be disposed along the signal paths. As well-known in the art, gain-flattening filters are utilized to properly condition the propagating signal to reduce the wavelength-dependent fluctuations in gain across the wideband wavelength range. FIG. 7 illustrates yet another DWDM transmission system embodiment (denoted as system 40B), which in this case includes an intermediate optical branching unit 48 that may be used as an add/drop device as well-known in the art.

Figure 8:
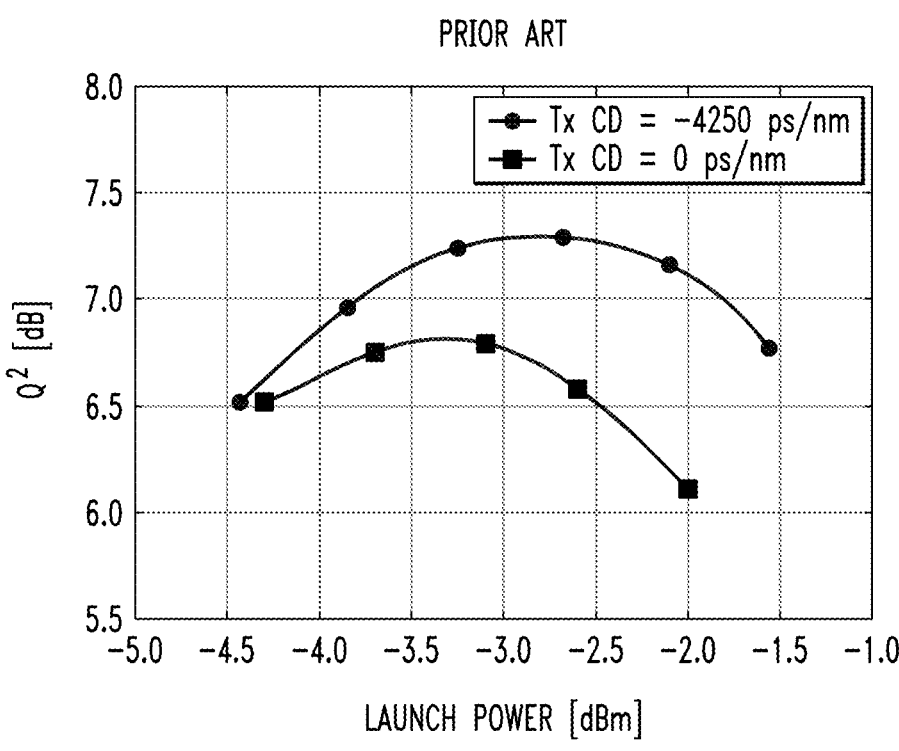
FIG. 8 is a graph of Q-factor versus per-channel launch power for two transmit pre-compensation values for a representative 100 Gb/s 1550 nm DP-QPSK lightwave transmission system after 5000 km.

An important metric for achieving ultra-high capacity DWDM lightwave transmission systems is known to be the dependence of the system's Q-factor on the transmitted optical launch power (per individual channel). FIG. 8 contains plots showing Q-factor versus per-channel launch power for two prior art transmit pre-compensation values for a representative 100 Gb/s per channel 1550 nm DP-QPSK lightwave transmission system after 5000 km. This graph is an example of the performance of a prior art DWDM 1550 nm lightwave system using standard solid core silica fibers, where standard fibers are known to exhibit nonlinear effects such that the Q-factor performance exhibits a sub-optimum inverted parabolic dependence on per channel input power. Indeed, the nonlinear effects in the standard (solid core) transmission fiber significantly limit the maximum optical power per channel that can be launched, yielding a maximum Q-factor value at relatively low powers, as shown in FIG. 8.

Figure 9:
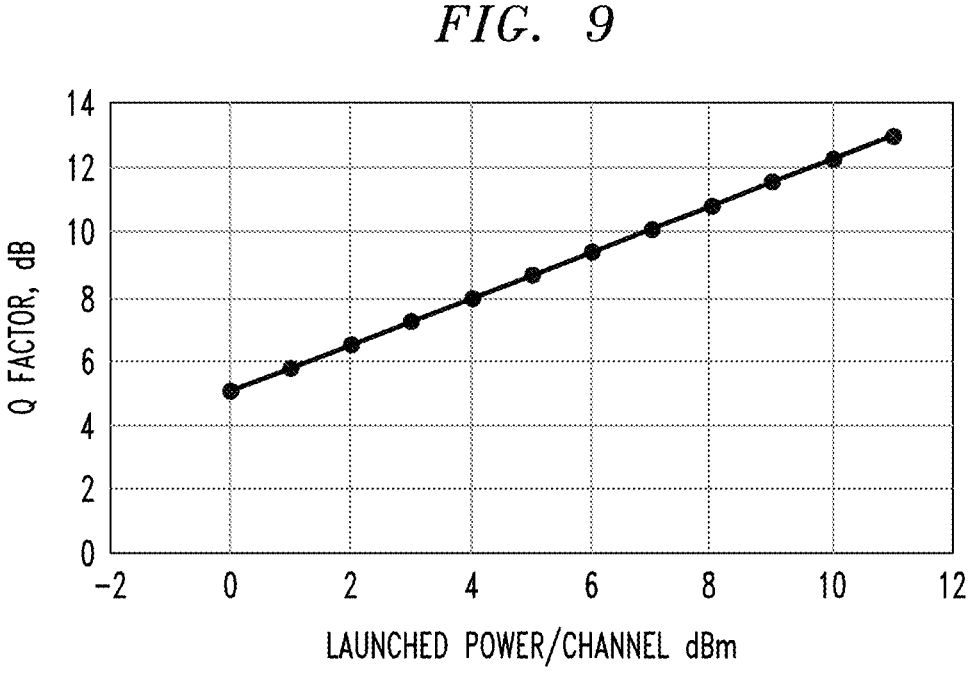
FIG. 9 is a plot of Q-factor vs. launched optical power per channel dependence for a novel 40,000 km DWDM 2000 nm 0.148 Pb/s capacity submarine lightwave system design.

In contrast to the plots of FIG. 8, FIG. 9 contains a plot of the Q-factor for an exemplary 40,000 km all-optical submarine lightwave system design. It is clear from a comparison of this plot to those of FIG. 8 that the utilization of DNANF hollow core fiber 10, which exhibits little or no non-linear effects as a function of propagating wavelength yields a configuration where the Q-factor dependence on per-channel signal input power is defined by a linear curve. It is expected that the threshold for the onset of nonlinearities in the DNANF hollow core transmission fiber described above is at least three orders of magnitude greater than the launched powers employed in transmission systems such as those described above.

With this understanding of the important components (as well as the relevant parameters of these components) utilized in accordance with the principles of the present invention to configure a high-capacity all-optical DWDM transmission system, a further explanation of two particular embodiments is considered to be useful in further understanding the operating principles of the inventive long-distance, unregenerated DWDM transmission system.

A first embodiment may be characterized as a terrestrial lightwave system, which as mentioned above may have a total system length of 10,000 km between its west termination 50 and its east termination 60. In one exemplary configuration, each fiber span 42 (E or W) may have a length of about 200 km, with the use of fifty (50) hybrid TDFA/HDFA devices 44 used at the concatenation point between sequential fiber spans 42 (i.e., NSPAN=NAMP=50).

In evaluating the OSNR (dB, 0.1 nm) as defined above for the 10,000 km terrestrial embodiment, it may be presumed that hybrid TDFA/HDFA devices 44 have a bandwidth on the order of 350 nm, with a total output power of 2.0 W and an NF of 6.0 dB (associated with an in-band pumping configuration for the amplifiers, as discussed in detail in our above-referenced co-pending patent application).

These values are to be considered exemplary for the designs and performances considered here in this example of a system design and implementation, and are not exclusive to the implementation of alternative novel DWDM lightwave systems which will be optimized for the specific and detailed performance requirements of each unique deployment and installation.

Using these values in the above equation, the OSNR (dB/0.1 nm) is calculated to have a value of approximately 33.0 dB. It follows that when using this system to support a data rate of 0.161 Pb/s, the system exhibits a relatively high "beginning of life" (BOL) OSNR margin of +9.0 dB/0.1 nm and Q-factor margin of +6.3 dB, leading to excellent system performance with significant margin to counteract the effects of fiber span aging, variations in amplifier gain with temperature and elapsed time, and other system lifetime considerations.

In particular, the OSNR margins calculated will depend strongly on the effective loss in dB/km over the total length of the fiber signal path (in this case, about 10,000 km). The effective margins are presumed to be different at BOL and "end-of-life" (EOL), where for the purposes of analysis the EOL OSNR margins are chosen to be 4.0 dB less than the BOL system margins, with the required OSNR/0.1 dB margin at EOL defined as 2.0 dB.

Figure 10:
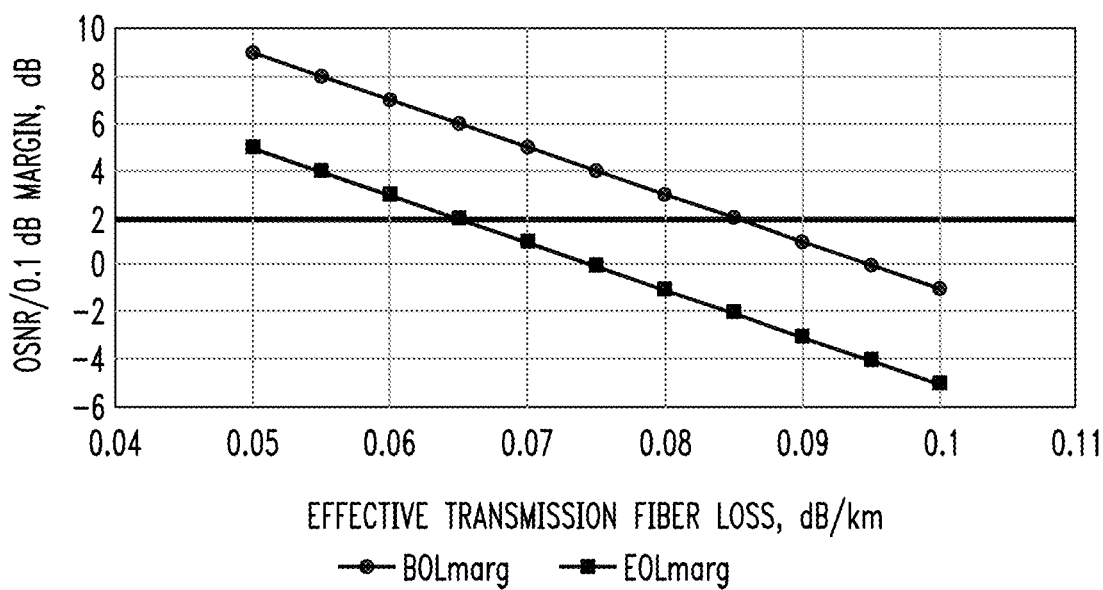
FIG. 10 is a graph of beginning of life (BOL) and end of life (EOL) margins for a novel 10,000 km DWDM 2000 nm 0.161 Pb/s capacity terrestrial lightwave system design as a function of effective loss in the transmission fiber.

FIG. 10 contains plots of BOL and EOL margins for the terrestrial lightwave system as a function of effective loss in the transmission fiber. It is evident from these plots that an effective loss of no greater than 0.065 dB/km is required for successful operation at EOL.

A second embodiment of the inventive DWDM transmission system is used to provide all-optical (i.e., no electronic generation) transmission for a submarine (undersea) system having a total system length of about 40,000 km. For this embodiment, a span length of 50 km was selected, resulting in the use of 800 fiber spans 42 in combination with 800 hybrid TDFA/HDFA devices 44. For this embodiment, it was proposed to use out-of-band pumping for devices 44, yielding a noise figure (NF) of 4.0 dB.

Figure 11:
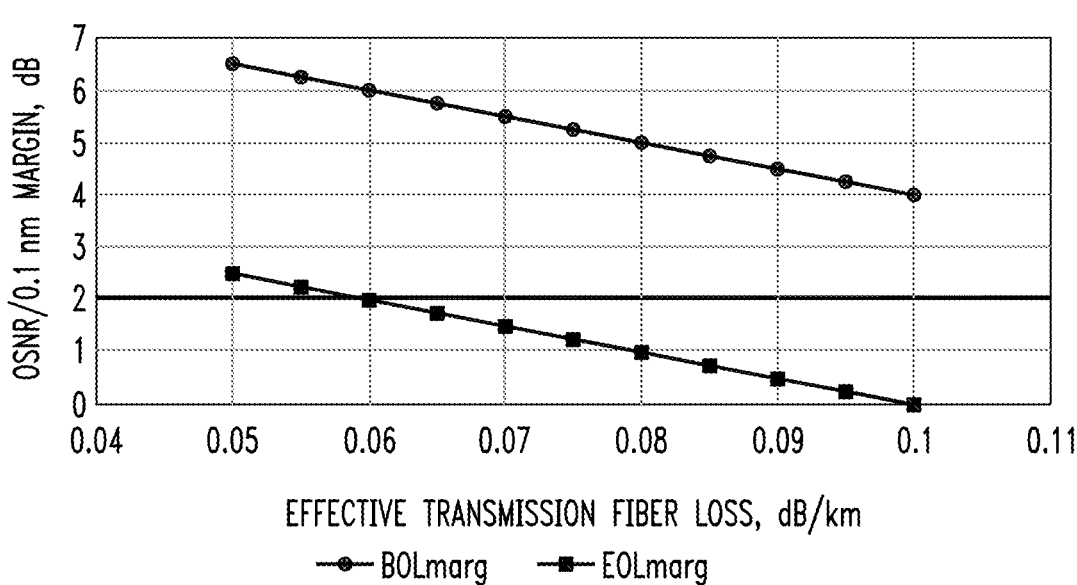
FIG. 11 is a graph of BOL and EOL margins for a novel 40,000 DWDM 2000 nm 0.161 Pb/s capacity submarine lightwave system design as a function of effective loss in the transmission fiber.

We then find that this 40,000 km 0.161 Pb/s DWDM system in the 2000 nm band has a high BOL OSNR margin of +6.5 dB/0.1 nm and Q-factor margin of +4.3 dB, leading again to excellent BOL system performance with significant margin to counteract the effects of system lifetime considerations. The capacity x distance product for this submarine system with robust margins is 5.92 Exabits/s·km. FIG. 11 contains plots of BOL and EOL margins for this undersea embodiment of providing all-optical transmission over a distance of about 40,000 km. Similar to the data shown in FIG. 10, FIG. 11 contains plots of OSNR margins as a function of effective loss in the transmission fiber. For this longer-distance undersea embodiment, effective losses no greater than 0.060 dB/km are necessary for successful system operation at EOL.

Figure 12:
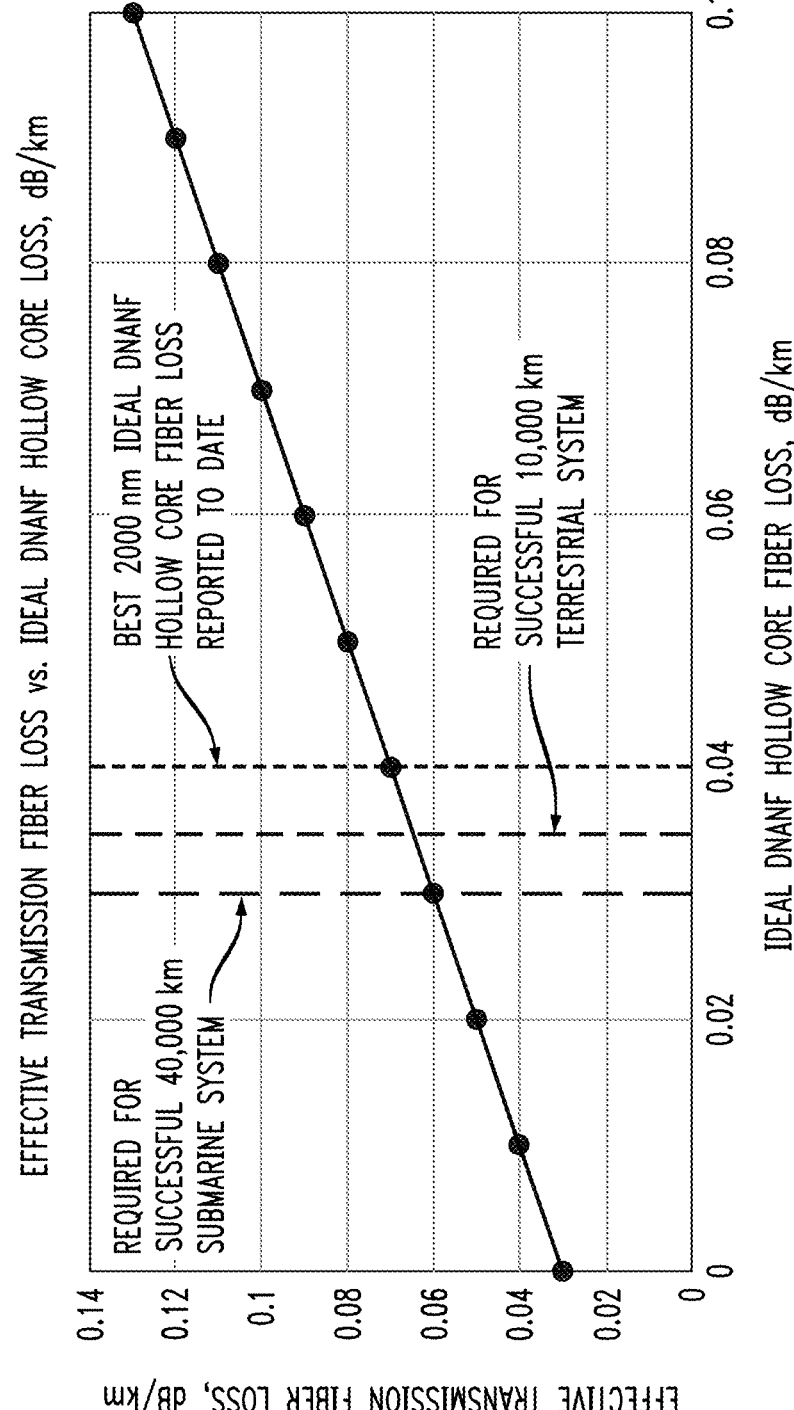
FIG. 12 is a plot of effective transmission loss of a hollow core fiber as a function of simulated ideal DNANF hollow core fiber loss.

With the parameters of both the 10,000 km terrestrial example and the 40,000 km undersea example in mind, FIG. 12 shows a plot of effective transmission fiber loss as a function of ideal simulated fiber loss in dB/km. To account for manufacturing variations in large quantity production of hollow core fiber, bend losses, cabling losses, and the effect of deployment of the fiber cables in demanding terrestrial and undersea environments, an additional factor of +0.030 dB/km is added to the ideal simulated loss to arrive at the effective transmission loss.

Therefore, successful operation of an all optical unregenerated terrestrial lightwave system over 10,000 km requires an ideal loss of no more than 0.035 dB/km. Successful operation of an optical unregenerated submarine lightwave system over 40,000 km requires an ideal loss of no more than 0.030 dB/km. We observe that the best value of predicted loss in a hollow core fiber design to date is 0.040 dB/km. For this reason, the novel hollow core fiber designs proposed in FIG. 1, with the performance shown in FIG. 2 that outperforms any hollow core fibers so far demonstrated with the current state of the art, are considered to be required for all-optical terrestrial systems that span 10,000 km with the necessary EOL margins, and for all-optical submarine systems that span 40,000 km with the necessary EOL margins.

Figure 13:
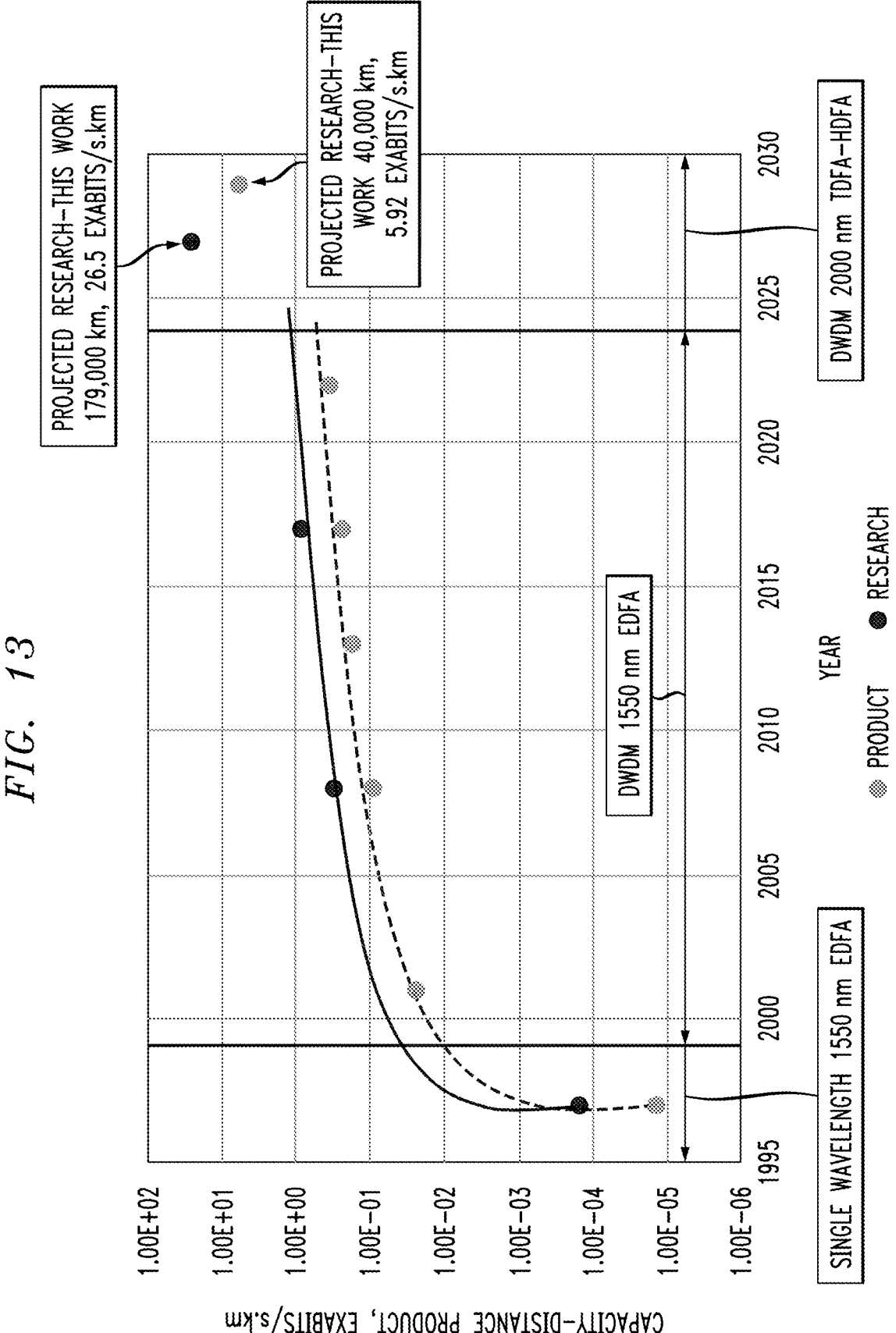
FIG. 13 shows 35 year historical trends for capacity x distance product in Exabits/s·km for fiber amplified lightwave systems through a single one-core optical fiber, with the projected performance of the novel 40,000 km DWDM 2000 nm 0.161 Pb/s capacity indicated for both a hero research experiment and a deployed system.

Turning to a discussion of the advantages of a long distance all-optical DWDM transmission system as provided in accordance with the present invention, FIG. 13 includes a plot of historical and projected trends for unregenerated lightwave transmission through a single one-core optical fiber in terms of capacity-distance product in Exabits/s·km. for optically amplified lightwave systems that have been designed and deployed over the past 35 years. It is shown that novel 2000 nm DWDM lightwave systems formed in accordance with the present invention are projected to outperform the 30 year historical trends by one and a half orders of magnitude or by a linear factor of 30. This projected improvement in overall performance is considered to validate the presented approach and points the way to new system designs with 40,000 km unregenerated Pb/s DWDM data transmission capabilities.

Figure 14:
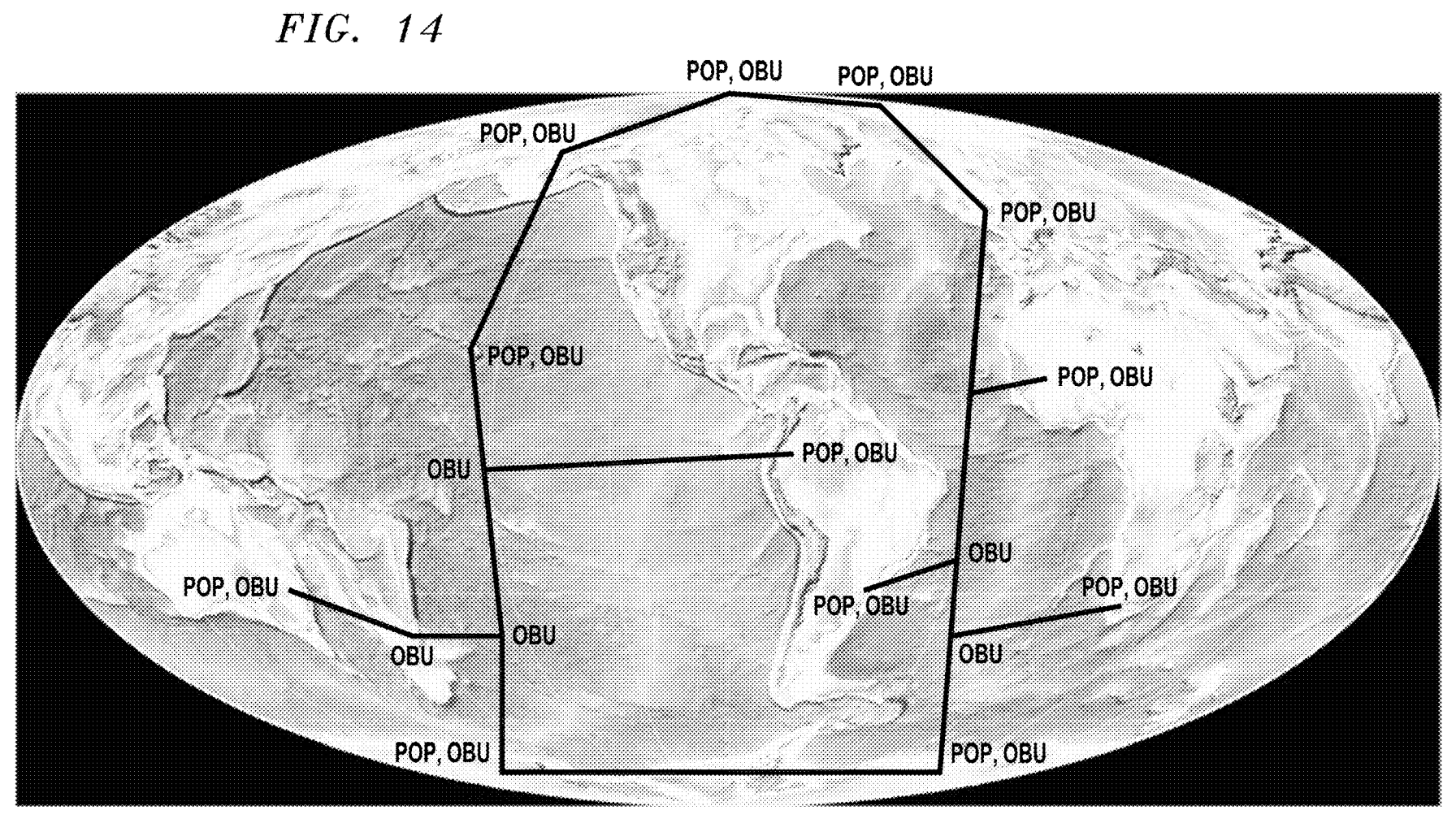

The advantages of a system formed in accordance with the present invention may be best understood with reference to FIG. 14, which shows an exemplary novel deployment of a trans-global 40,000 km all optical lightwave system implementation having no electronic regeneration and capable of unregenerated transmission through a distance equivalent to the circumference of the Earth at the equator (40,075 km). In this example, the proposed 40,000 km unregenerated 2000 nm DWDM Pb/s optical fiber submarine transmission system is named North-South TransGlobal I; POP=point of presence for electrical powering and optical/electronic add/drop; and OBU=optical branching unit.

In this exemplary implementation, the novel trans-global 40,000 km 2000 nm DWDM lightwave system may be considered to begin at a first POP in Antarctica; then progress northward through an undersea fiber optical cable system with appropriate branching to Australia, New Zealand, and South America to a landing point in Hawaii, USA; then progress northward to the next landing point in Alaska, USA; then progress northward to a floating man-made island located at or near the North Pole; then progress southward to Spitzbergen, Norway; then progress southward to the United Kingdom; them progress southward to a second POP in Antarctica with appropriate branching to Africa and South America; and finally progress to the beginning POP also in Antarctica to complete the 40,000 km all optical ring system. Electrical power for the POPs at the North Pole and in Antarctica may be provided by appropriately sized nuclear-reactor-enabled power stations.

This implementation of North-South TransGlobal I 2000 nm Pb/s capacity DWDM lightwave system is to be considered exemplary, and is not exclusive to the implementation of alternative novel DWDM trans-global lightwave systems which will be optimized for the specific and detailed performance requirements of each unique deployment and installation.

While the principles of the invention have been described herein, it is to be understood by those skilled in the art that this description is made only by way of example and not as a limitation as to scope of the invention. Modifications and substitutions by one of ordinary skill in the art are considered to be within the scope of the present invention, which is not to be limited except by the following claims.

What is claimed is:

1. An all-optical dense wavelength division multiplexed (DWDM) lightwave transmission system operating in the 2000 nm region, the system comprising:
   a pair of separated optical transceiver stations defined as a first transceiver station and a second transceiver station; and
   an optical fiber signal path between the transceiver stations for supporting bi-directional DWDM lightwave transmission between the first transceiver station and the second transceiver station,
   where the optical fiber signal path comprises a plurality of N bi-directional transmission spans, each bi-directional transmission span comprising a hybrid TDFA/HDFA repeater device in each direction and a section of hollow core fiber coupled to the output of the repeater device,
   wherein DWDM lightwave transmission between the first transceiver station and the second transceiver station is supported along the signal paths without requiring electrical regeneration of the propagating optical signals,
   wherein each section of hollow core fiber comprises a section of double-nested anti-resonant nodeless fiber (DNANF), and
   wherein each section of DNANF includes a set of five double-nested fiber elements.

2. The system as defined in claim 1, wherein the set of five double-nested fiber elements is disposed in an arrangement that forms a pentagonal-shaped central hollow core optical signal path.

3. The system as defined in claim 1, wherein each section of hollow core fiber has a bandwidth of 380 nm.

4. The system as defined in claim 3, wherein the bandwidth of about 380 nm spans the wavelength range of 1720 nm to 2100 nm.

5. The system as defined in claim 1, wherein the system operates in the range of 1725-2100 nm.

6. An all-optical dense wavelength division multiplexed (DWDM) lightwave transmission system operating in the 2000 nm region, the system comprising:
   a pair of separated optical transceiver stations defined as a first transceiver station and a second transceiver station; and
   an optical fiber signal path between the transceiver stations for supporting bi-directional DWDM lightwave transmission between the first transceiver station and the second transceiver station,
   where the optical fiber signal path comprises a plurality of N bi-directional transmission spans, each bi-directional transmission span comprising a hybrid TDFA/HDFA repeater device in each direction and a section of hollow core fiber coupled to the output of the repeater device,
   wherein DWDM lightwave transmission between the first transceiver station and the second transceiver station is supported along the signal paths without requiring electrical regeneration of the propagating optical signals,
   wherein each section of hollow core fiber comprises a section of double-nested anti-resonant nodeless fiber (DNANF), and
   wherein each section of DNANF exhibits an ideal loss no greater than 0.035 dB/km.

7. The system as defined in claim 6, wherein each section of DNANF exhibits an ideal loss of no more than 0.030 dB/km.

\* \* \* \* \*